United States Patent [19]

Benninger et al.

[11] 3,882,178

[45] May 6, 1975

[54] FLUORINATED TERTIARY AMINO ETHERS

[75] Inventors: Siegfried Benninger, Schwalbach, Taunus; Siegfried Rebsdat, Neuotting; Rudolf Kohlhaas, Fischbach, Taunus, Germany

[73] Assignee: Hoechst Aktiengesellschaft, Frankfurt am Main, Germany

[22] Filed: Aug. 9, 1973

[21] Appl. No.: 386,861

[30] Foreign Application Priority Data

Aug. 12, 1972 Germany............................ 2239800

[52] U.S. Cl............ 260/563 R; 260/584 C; 204/59; 252/77; 424/358
[51] Int. Cl.............................................. C07c 87/36
[58] Field of Search ..................... 260/584 C, 563 R

[56] References Cited
UNITED STATES PATENTS

| | | | |
|---|---|---|---|
| 2,519,983 | 8/1950 | Simons........................ | 260/583 GG |
| 2,594,272 | 4/1952 | Kauck et al................. | 260/583 GG |
| 2,616,927 | 10/1952 | Kauck et al................. | 260/583 GG |
| 2,631,151 | 3/1953 | Kauck et al................. | 260/583 GG |
| 2,713,593 | 7/1955 | Brice et al.................... | 260/584 C |
| 3,641,167 | 2/1972 | Moore et al................. | 260/583 GG |

FOREIGN PATENTS OR APPLICATIONS

| | | | |
|---|---|---|---|
| 1,026,925 | 4/1966 | United Kingdom.......... | 260/583 GG |
| 817,151 | 10/1951 | Germany...................... | 260/583 GG |
| 841,151 | 6/1952 | Germany...................... | 260/583 GG |
| 1,069,639 | 11/1959 | Germany...................... | 260/583 GG |
| 1,389,724 | 1/1965 | France.......................... | 260/583 GG |

*Primary Examiner*—Elbert L. Roberts
*Assistant Examiner*—D. R. Phillips
*Attorney, Agent, or Firm*—Curtis, Morris & Safford

[57] ABSTRACT

Tetrafluoro-ethylene can be added to monoamines having oxyethyl or oxypropyl groups in aprotic polar solvents in the presence of alkali metals. The new monoamines obtained having the radicals tetrafluoro-ethyloxy-ethyl or tetrafluoro-ethyl-oxy-propyl are electrolyzed in anhydrous hydrofluoric acid, thus forming new monoamines in which all or nearly all hydrogen atoms of the starting compounds are replaced by fluorine.

16 Claims, 1 Drawing Figure

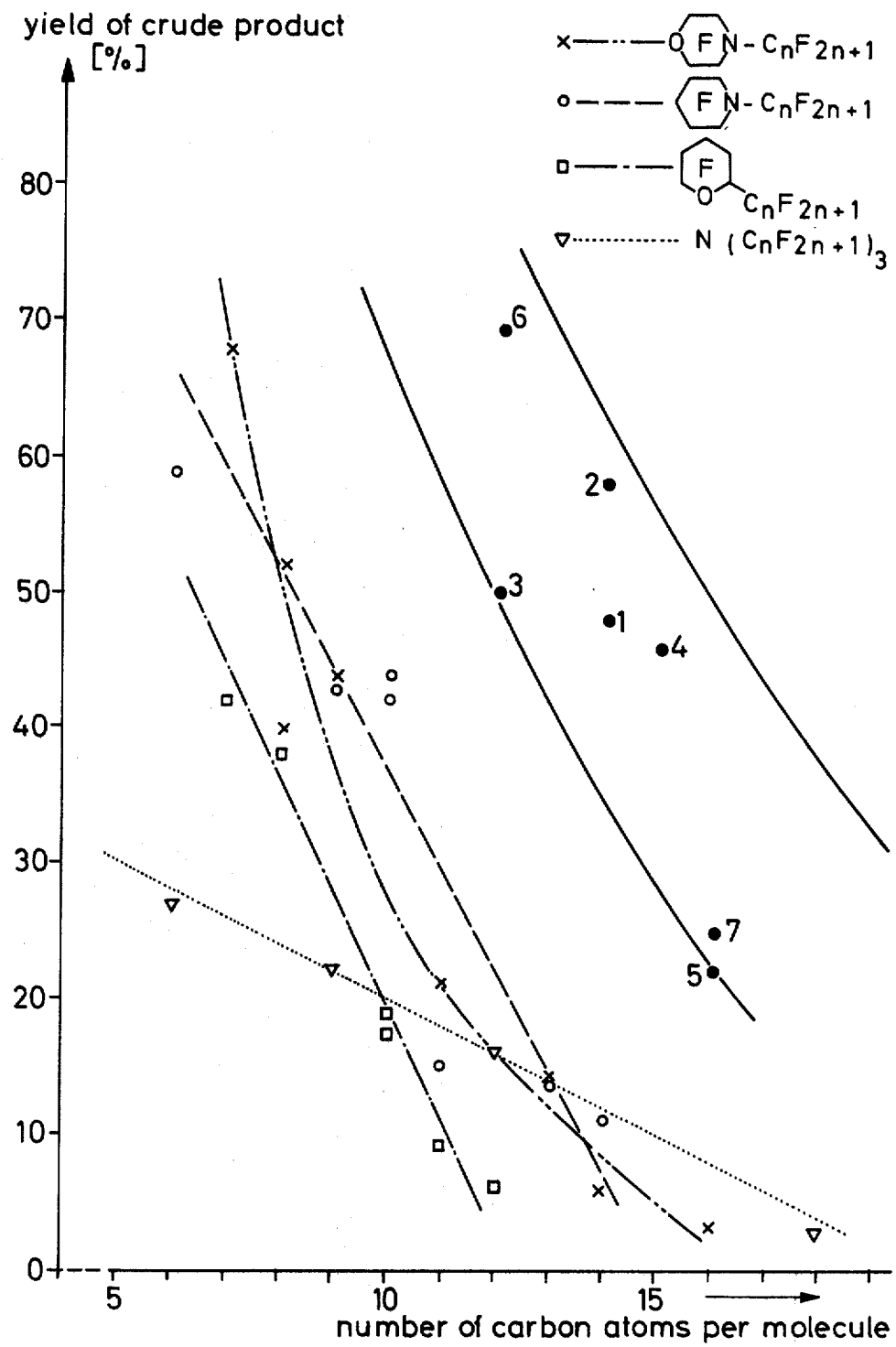

FLUORINATED TERTIARY AMINO ETHERS

The present invention relates to fluorinated tertiary amino ethers and their preparation from the corresponding ω-(tetrafluoro-ethoxy)-alkylene amines.

The advantages of perfluoro-alkanes for such applications which require chemically inert liquids of thermal high stability are known (cf. for example U.S. Pat. Nos. 2,519,983, 3,641,167; German Pat. Nos. 817,151, 841,151; British Pat. No. 1,026,925).

Such applications occur in chemical and nuclear technics where, for example, stability to pure oxygen under elevated pressure, or elementary fluorine may be required, but also in the field of electrotechnics, electronics or engineering. Besides the extraordinary chemical resistance, also a series of other data is important for such applications, for example dielectric constant, surface tension, break down voltage, viscosity, factor of dielectric losses of high frequency electromagnetic fields, solvency to plastics and the like.

Furthermore it is known that certain perfluoro-alkyl derivatives, especially ethers and tertiary amines, are very close to the perfluoro-alkanes with respect to their properties and nearly cannot be distinguished from these alkanes by chemical means. With respect to physical properties, this is above all true for the boiling point, due to the extremely small intermolecular forces.

Subject of the present invention is a new class of perfluorinated organic substances which comprise perfluoro-alkylene, perfluoro-alkyl or ω-H-perfluoro-alkyl groups and the hetero-atoms nitrogen and oxygen. The compounds of the invention correspond to the following formula (I)

(I)

where
R$_{F1}$ and R$_{F2}$ each are perfluoro-alkyl radicals which may be linear or branched or cyclic, especially perfluoro-alkyl radicals having from one to 10 carbon atoms, or perfluoro-cycloalkyl radicals having from four to 10 carbon atoms;
R$_3$ is CF$_3$ or F;
R$_4$ is H or F;
$x$, $y$ and $z$ each are integers; $x$ and $y$ being 1, 2 or 3; $z$ being 0, 1 or 2; and
$x + y + z$ are 6.

In a quite general sense, the substances in accordance with the present invention are tertiary perfluoroalkylamines which are distinguished from those hitherto known by the fact that at least one of the 3 perfluoro-alkyl groups is replaced by an ether group of the following structure formula $$-CF_2CF_2OCF_2CF_2R_4$$

or

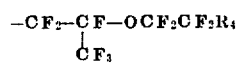

Interesting are also such mixtures of compounds of formula I which are obtained in the electrofluorination of a compound of formula III cited below. These mixtures of homologous compounds are formed because at different points C—C bonds and C—O bonds may be cleaved during the fluorination with a shortening of the chain occuring. The radicals R$_{F1}$, R$_{F2}$, R$_3$ and R$_4$ may be shortened in a different manner, so that one starting compound may yield a spectrum of perfluoro compounds of formula I. For many technical applications, it is entirely sufficient or even advantageous to use these mixtures instead of an isolated pure compound.

Furthermore, the invention comprises compounds of the formula (III)

(III)

where
R$_1$ and R$_2$ are alkyl radicals having from one to 10 carbon atoms or cycloalkyl radicals having from four to 10 carbon atoms;
R$_5$ is CH$_3$ or H;
$x$, $y$ and $z$ each are integers; $x$ and $y$ being 1, 2 or 3; $z$ being 0, 1 or 2 and
$x + y + z$ are 6.

This invention also provides processes for the preparation of compounds of formula I, which comprise dissolving a compound of formula III containing the fluorine-free substituents R$_1$, R$_2$ and R$_5$ in anhydrous hydrofluoric acid and electrolyzing the solution (so-called electric fluorination). Furthermore, the invention provides a process for the preparation of compounds of formula III which comprises reacting an amino-alcohol of the formula (II)

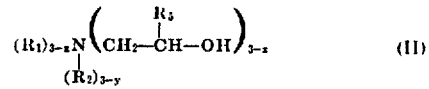

(II)

or the alcoholate thereof corresponding to the formula (IIa)

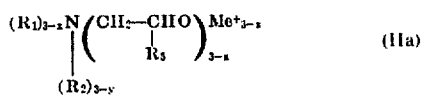

(IIa)

where R$_1$, R$_2$, R$_5$, $x$, $y$, and $z$ are as defined above, with tetra-fluoro-ethylene in an aprotic solvent in the presence of an alkali metal as catalyst; the reaction being preferably carried out at a temperature of from 10° to 50°C.

It has therefore been found that, by the electrofluorination according to the present invention of tertiary amino ethers (III) having the aforementioned structural characteristics, a class of compounds (I) is surprisingly obtained which are excellently suitable for the cited uses, that is, heat transfer media, hydraulic liquids, dielectrics, liquids inert to aggressive gases, but also as blood substitute.

The numerous variation possibilities of the factors $x$, $y$, $z$ and the substituents R$_{F1}$, R$_{F2}$ and R$_3$ permit determined alterations of the product properties over a relatively wide scope. By choosing long-chain radicals R$_{F1}$ and R$_{F2}$, it is for example possible to prepare high-boiling compounds, the properties of which are very close to those of the tertiary perfluoro-alkylamines. By chain branching or incorporation of cyclic substituents, the solidification point may be lowered; by using long-chain linear radicals R$_{F1}$ and R$_{F2}$ and thus raising the solidification point, the properties approach those of the more wax-like higher telomers of tetrafluoro-ethylene. By decreasing the value of $z$ from 2 to 1 or 0, the properties become more approximate to those of oligomeric perfluoro-ethylene or perfluoro-propylene oxides.

The products in accordance with the present invention where $R_4$ is F are distinguished by an extraordinary chemical stability to the usual aggressive chemicals, for example concentrated mineral acids and alkaline lyes, oxidants and reducing agents; they may be chemically affected only by alkali metals and aluminum chloride at elevated temperatures. The nitrogen atoms cannot be protonated even by very strong mineral acids and thus do not possess any basic properties. Elementary fluorine, halogenated fluorides and other highly reactive fluorination agents, for example $CoF_3$, perceptibly affect the substances only under severe physical conditions; they degrade them to short-chain perfluoro-alkyl compounds. The products of the invention are inert to oxygen within a wide range of pressures and temperatures; at 300°C and 100 atm/gauge of $O_2$, for example, no signs of attack on $C_4F_9N(C_2F_4OC_2F_5)_2$ can be detected.

The indicated properties offer application possibilities as heat transfer media for a wide range of temperatures for the substances (I) of the invention, especially in electronic or electric systems, or as hydraulic liquids. Their absolute biological inertness permits furthermore their use as a blood substitute; the advantage of the substances of the invention over those hitherto tested resides in their better dispersibility in aqueous solutions, besides favorable solubility conditions for $O_2$ and $CO_2$.

It is known that in the course of electro-chemical fluorination processes besides perfluorinated products also different amounts of incompletely fluorinated products are formed. Within the scope of this invention, by choosing suitable fluorination conditions it is possible to obtain determined products which correspond to the aforementioned formula (I), where, however, $R_4$ is H, so that they have the following formula (Ia):

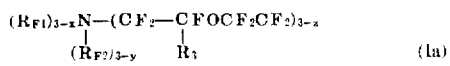

(Ia)

As is shown by the Examples, the amount of incompletely fluorinated substances can be increased by elevated temperatures in the case of $R_4$ being H as compared to the main products where $R_4$ is F, while by electrolysis at lower temperatures this amount decreases as compared to the H-free substances.

The hydrogen containing products in which $R_4$ is H and $z$ is 2, or $R_4$ is H or both H and F in the same compound and $z$ is 0 or 1, nearly cannot be distinguished chemically from the perfluorinated analogous compounds. It is known that terminal H atoms on $(CF_2)_n$ chains are screened by the fluorine atoms in such a manner that they lose their usual reactive behavior and remain almost chemically inert. It is not possible, for example to split off HF from such compounds even by a several hour heating with 20 percent alkali metal hydroxide solutions.

The thermal stability of this class of substances is of a correspondingly high degree, so that for a lot of applications of the perfluoro-alkyl compounds of the invention a separation of the H-containing amounts by distillation is not necessary. Because of their elevated boiling points as compared to the perfluorinated compounds, they enlarge the scope of products among which a choice may be made. Thus, it may be important in certain cases to use for example a cooling liquid having a wider boiling range instead of one having a distinct boiling point.

As mentioned before, the present invention provides not only the already described fluorination products, but also the starting products of formula III. These compounds (III) are also a new class of substances which are prepared in known manner by reaction of the corresponding amino alcohols of formula II or the amino alcoholates thereof of formula IIa with tetrafluoro-ethylene according to the reaction scheme indicated further below.

The products are water-insoluble liquids of oily consistency which form mostly water-soluble salts with acids.

As their structure shows, the compounds of formula III may serve as interesting starting materials for the electric fluorination, and in this process give yields of fluorination products which, depending on the size of the molecules, are above the results for comparable tertiary amines or ethers having the same number of carbon atoms by a factor 3 to 4 and by a still higher factor in the case of long-chain substituents $R_1$ and $R_2$.

In the drawing, the yields cited in the Examples are compared to some examples from the literature. The numbers there indicate the yield in accordance with the example of the same number; thus number 1 corresponds to the yield of Example 1. The yields corresponding to the indicated formulae were taken from Zh. obsc. chim. 35, 485 (1965); French Pat. No. 1,389,724; U.S. Pat. Nos. 2,594,272 and 2,644,823; German Auslegeschrift No. 1,069,639; U.S. Pat. Nos. 2,616,927 and 2,631,151.

By using partially fluorinated substances, generally the requirements for current and cooling energy for the cooling of the cell and the HF condensation from the waste gases are decreased.

The fact that these substances start from cheap technical grade large-scale manufactured products, such as ethylene oxide, propylene oxide, tetrafluoro-ethylene and the corresponding primary or secondary amines or ammonia, has a favorable effect on the profitability of the fluorination process and the fluorinated products.

The compounds of formula III in accordance with the present invention are not only suitable for the aforementioned fluorination reactions, but also for various other reactions. Thus, they are interesting intermediate products for the manufacture of dyestuffs, preliminary products for dyestuffs, and surface-active agents.

For the preparation of the tertiary tetrafluoro-ethoxy-alkylene amines (III), the alkylamine (II) is dissolved in an aprotic solvent, for example dimethyl formamide (DMF), and reacted with a fraction of the theoretical amount of an alkali metal, for example sodium, to form the alcoholate of formula IIa, which, in a temperature range of from about 15° to 60°C, in an autoclave with agitator under a pressure of about 2atm/gauge reacts with tetrafluoro-ethylene to form the desired adduct (III) according to the following scheme:

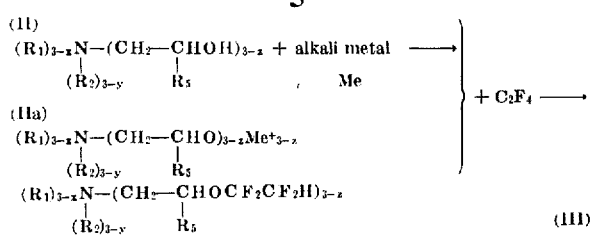

The starting compounds of Examples 1, 5 and 7 are prepared according to this process.

Because of their sensitivity to high temperatures, the adducts generally are not distilled, but washed with water and dried.

As the Examples show, the reactions proceed with high yields. The structures of the compounds were determined by F-19- and H-NMR spectra, besides analysis data. The electric fluorination of the products III to the compounds of formula I was carried out in a classic Simons cell (cf. U.S. Pat. No. 2,519,983), consisting of a doubly jacketed vessel made from V4A steel having a capacity of about 1.5 liters and a package of electrodes having 25 nickel plates at a distance of 2.5 mm between each plate; the active anode surface being 30.8 dm². The cell was furthermore provided with a liquid level indicator, a circulation pump, and a reflux condenser as well as devices for the scrubbing of waste gas.

The reactions proceeded always for several days: because of a prolonged inhibition period at the start, the formation of product is delayed. Advantageous operational conditions were given at a voltage of from 4.0 to 7.5 volts, preferably from 4.5 to 6.5 volts, and a current density of from 0.5 to 1.5 A/dm². The concentration of the starting material was maintained in a range of from 5 to 25 weight percent; this material being fed in batchwise, depending on the consumption. The liquid level in the cell was kept constant by adding hydrofluoric acid, if necessary.

The electrolysis may be carried out within a relatively wide temperature range. The aforementioned influence of the temperature on the composition of the products permits the preparation of substantially perfluorinated products by electrolysis at low temperatures, or the increased formation of hydrogen containing fluorination products of the above formula I$a$.

An economically reasonable temperature range is from about −20° to + 30°C, preferably from −5° to + 15°C; below −20°C the conductivity decreases to very low values even at elevated electrolyte concentration, while at a temperature above + 30°C, besides the hydrogen containing products also the concentration of perfluorinated degradation products increases rapidly. When operating on a pilot plant scale, the yields are relatively higher by about 30 to 60 percent as compared to the laboratory processes. In the fluorination of tris-(tetrafluoro-ethoxy-ethyl)-amine, for example, crude yields of far more than 70 percent of the theoretical yield were obtained.

On account of the good conductivity of the amino ether solutions, it is not necessary to add a conductive salt.

Because of their insolubility in hydrofluoric acid and their relatively high density of from about 1.7 to 2.0 g/cm², the perfluorination products precipitate to the cell bottom and are discharged from there.

The crude products always contain small amounts of carboxylic acid fluorides which are formed by splitting off the ether groups. In order to remove these perfluorinated acids, the crude products are refluxed for several hours with 20 to 25 percent aqueous alkaline solution. By this treatment, partially fluorinated unstable compounds are simultaneously removed by splitting-off of HF and the resinification of the unsaturated products formed. Thus, this treatment stabilizes the products, since only chemically inert components remain.

By subsequent steam distillation from alkaline solution, the inert substances are isolated. They are dried in the usual manner and subjected to a fractionation.

The analysis of the products was carried out by gas chromatography; after their isolation, the structure of the individual components was determined, on the basis of the analysis data, by preparative gas chromatography as well as mass and F-19-NMR spectroscopy.

The following examples illustrate the invention.

Electrofluorination of formula III products

EXAMPLE 1

100 g of the amino ether n-butyl-bis-(tetrafluoro-ethoxy-isopropyl)-amine and 1,400 g of anhydrous hydrofluoric acid were introduced into a so-called Simons cell. In the course of 67 hours a further 550 g of the amino ether were added; in order to maintain about stationary operational conditions, this addition was made in intervals of a few hours. The temperature of the electrolyte was kept at a constant + 5°C; the voltage, depending on the concentration, was from 5.4 to 6.5 volts; when it attained the upper limit, from 30 to 50 g of starting material were added again. The amperage was maintained at a constant 45 A for nearly the entire time. The crude yield was 682 g of perfluorinated product; relative to the following reaction equation, this corresponds to 47.7 percent of the theoretical yield.

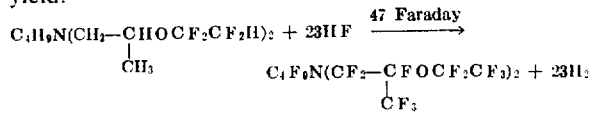

The yield of stabilized product was 44.5 percent of the theoretical yield, the boiling range of the stabilized crude product was from 134° to 207.1°C/760 mm Hg (corrected).

The following components were isolated by gas chromatography and their structure identified:

1. The main compound, according to the mass spectrum, had a molecular weight (M) of 803; the heaviest mass observed was $m/e$ = 784, corresponding to M−F.

Analysis found: 21.4 % C; 72.4 % F; < 0.3 % H;
Calculated: 20.9 % C; 73.3 % F; 0 % H.

By means of the F-19-NMR spectrum, the following structure was confirmed: $CF_3(CF_2)_3N(CF_2CF(CF_3)OC_2F_5)_2$. 74 percent of the fraction having a boiling range of from 185° to 202°C consisted of this component.

2. Secondary component, taking about 11 area percent in the gas chromatogram, was the following substance, according to the mass and F-19-NMR spectra: $CF_3(CF_2)_3N(C_2F_5OC_2F_5)_2$.

This substance took 71 area percent of the fraction having a boiling range of from 170° to 182°C.

| Analysis found: | 21.1 % C; 71.7 % F; < 0.3 % H; |
|---|---|
| Calculated: | 20.5 % C; 73.0 % F; 0 % H. |

The crude product contained also a series of trace components the amount of which was mostly less than 1 area percent.

EXAMPLE 2

This example, with the exception of the electrolysis temperature raised to + 15°C, is a repetition of Example 1. A total of 280 g of n-$C_4H_9N[CH_2CH(CH_3)OC_2F_4H]_2$ was electrolyzed within 26 hours at a constant amperage of 45 A and a voltage range of from 4.6 to 5.4 volts; 404 g, corresponding to 68 percent of the theoretical yield, was obtained. The yield of stabilized fluorination product was 57.8 percent of the theoretical yield. The boiling range of the stabilized product was from 83° to 206.5°C/760 mm Hg (corrected).

The gas chromatography analysis yielded the following composition:

1. $CF_3N[CF_2CF(CF_3)OC_2F_5]_2$ having a molecular weight of 587, determined by mass spectroscopic methods (heaviest mass observed: $m/e =$ 568 $M^{\oplus}F$).

| Analysis found: | 20.8 % C; 72.2 % F |
|---|---|
| calculated: | 20.5 % C; 73.4 % F |

6.9 area percent of this substance were contained in the crude product; it was obtained with a 85 percent degree of purity by fractionation.

2.

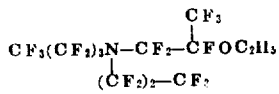

According to gas chromatography, the crude product obtained contained 8.4 area percent of a substance of the above structure which, after a preparative isolation, was determined in the same manner as the other components. The molecular weight was 685.

| Analysis found: | 21.3 % C; 72.8 % F |
|---|---|
| calculated: | 21.0 % C; 74.8 % F |

In the fraction having the boiling range of from 167° to 172.5°C/760 mm Hg (corrected), the substance, taking 43 area percent, was the main component.

3. The substance $CF_3(CF_2)_3N(C_2F_4—OC_2F_5)_2$ was contained in the crude product with only 19 area percent.
4. The substance $CF_3(CF_2)_3N[CF_2CF(CF_3) OC_2F_5]_2$ formed as main component in Example 1, was the main component also in this case, since it took 25 area percent.
5. The substance $CF_3(CF_2)_3N[CF_2CF(CF_3)OCF_2CF_2H]_2$ was identified by mass spectroscopy, 4.8 area percent of it were contained in the crude product.

EXAMPLE 3

In the course of 82 hours, 817 g of fluorination product, corresponding to 49.7 percent of the theoretical yield, relative to the following reaction equation

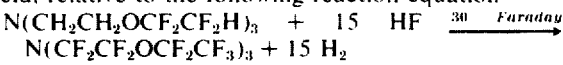

$N(CH_2CH_2OCF_2CF_2H)_3$ + 15 HF → $N(CF_2CF_2OCF_2CF_3)_3$ + 15 $H_2$ were obtained from a total of 925 g of the amino ether tris-(tetra-fluoro-ethoxy-ethyl)-amine.

The electrolysis temperature was about + 5°C, the voltage ranged from 5.1 to 6.4 volts and the average current density was 1.5 A/dm². After work-up, 93 percent of the material used were obtained as stabilized inert liquid having a boiling range of from 106° to 182.5°C/760 torrs (corrected). As main component, the crude mixture contained 51 area percent of the desired compound having the following structure: $N(CF_2CF_2OCF_2CF_3)_3$, as resulted from the mass and NMR spectra.

| Analysis found: | 20.6 % C; 69.6 % F; < 0.3 % H |
|---|---|
| calculated: | 20.0 % C; 71.3 % F; 0 % H. |

Furthermore, the stabilized product contained the following substances which were identified by mass spectroscopy:

| | |
|---|---|
| $CF_3N(C_2F_4OC_2F_5)_2$ | 9.5 area % |
| $C_2F_5N(C_2F_4OC_2F_5)_2$ | 7.0 area % |
| $(C_2F_5OC_2F_4)_2NC_2F_4OC_2F_4H$ | 9.0 area %; the structure corresponds to the NMR-spectra |
| $N(C_2F_4OC_2F_4H)_3$ | 2.2 area % |

EXAMPLE 4

The Simons cell was charged with 1,400 g of anhydrous hydrofluoric acid and 100 g of tris-(tetrafluoro-ethoxy-isopropyl)-amine. At an average electrolysis temperature of + 5°C and an average amperage of 46 A, the voltage was in the range of from 4.9 to 6.5 volts. Within a total time of 100 hours, a total of 800 g of starting material was fed in batchwise. The total yield of fluorination product was 730 g, corresponding to 45.8 percent of the theoretical yield, relative to the following reaction equation:

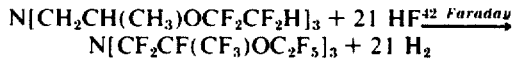

$N[CH_2CH(CH_3)OCF_2CF_2H]_3$ + 21 HF → $N[CF_2CF(CF_3)OC_2F_5]_3$ + 21 $H_2$

After work-up with potassium hydroxide solution, 90.0 weight percent thereof were obtained as dry inert liquid. The gas chromatography analysis yielded the following:

45 area percent of the theoretically expected substance were contained in the mixture.

Heaviest mass observed in the mass spectrum: $e/m =$ 800, corresponding to M—$CF_3$. The NMR spectrum was identical with the indicated structure.

| Analysis found: | 21.0 % C; 70.5 % F; |
|---|---|
| calculated: | 20.7 % C; 72.1 % F. |

Furthermore, the following degradation products of this substance were identified:

$CF_3(CF_2)_2N[CF_2CF(CF_3)OC_2F_5]_2$ 17 area percent;

mass spectrum: $e/m = 734$ as heaviest mass, corresponding to $M-F$;

$CF_3N[CF_2CF(CF_3)OC_2F_5]_2$ ; 8 area percent.

Heaviest mass observed: $e/m = 634$, corresponding to $M-F$. Structure identical to the NMR spectrum.

Analysis  found: 20.8 % C; 72.0 % F;
         calculated: 20.7 % C; 73.2 % F

The spectroscopic determination of structures yielded furthermore the following 3 hydrogen containing compounds having a common area percentage of about 22 percent:

$HC_2F_4OCF(CF_3)CF_2N[CF_2CF(CF_3)OC_2F_5]_2$ , $[HC_2F_4OCF(CF_3)CF_2]_2NCF_2CF(CF_3)OC_2F_5$ , and $N[CF_2CF(CF_3)OC_2F_4H]_3$ .

The boiling range of the stabilized crude mixture was from 96.5° to 209°C/760 mm Hg (corrected).

EXAMPLE 5

In the same manner as in the aforementioned Examples, the electrofluorination of 360 g of n-octyl-bis(tetrafluoroethoxy-ethyl)-amine was carried out. The average current density was about 1.0 A/dm² at an electrolysis temperature of + 5°C; the voltage being in the range of from 4.2 to 6.5 volts.

After a time of 90 hours, 142 g of fluorinated product were formed, corresponding to 21.8 percent of the theoretical yield, relative to the following reaction equation

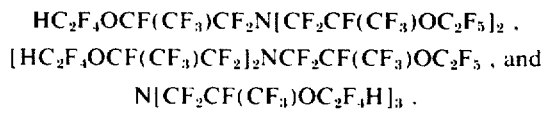

$CH_3(CH_2)_7N(CH_2CH_2OCF_2CF_2H)_2 + 27$ HF $\xrightarrow{54\ Faraday}$
$C_8F_{17}N(C_2F_4OC_2F_5)_2 + 27$ $H_2$ After the usual stabilization with potassium hydroxide solution, there was no steam distillation because of the expected low volatility. Instead, after separation of the potassium hydroxide solution, the product was washed several times with water and then dried with $CaSO_4 \cdot \frac{1}{2} H_2O$. In order to reduce the viscosity, trichloro-trifluoro-ethane was added previously which, after drying, was distilled off again. The stabilization reduced the crude yield from 21.8 to a total of 14.2 percent of the theoretical yield. In the fractionation, the main component passed over at 170° to 172°C/760 mm Hg. At normal pressure, a boiling range of from 222° to 237.5°C/760 mm Hg (corrected) was measured.

This fraction contained 84 area percent of a substance which, according to the spectroscopic results, was identified as $CF_3(CF_2)_7N(CF_2CF_2OCF_2CF_3)_2$. The molecular weight was 903 (mass spectrum: heaviest mass $e/m = 884$, $M \rightleftharpoons F$)

Analysis  found: 21.7 % C; 73.1 % F;
         calculated: 21.2 % C; 73.6 % F.

Besides the main component of the cited structure which took 58 area percent of the crude product, this product contained various secondary components which were not isolated because of their small amounts.

EXAMPLE 6

In an electrolysis cell having a capacity of about 38 liters, a mixture of 2.0 kg of tris-(tetrafluoro-ethoxy-ethyl)amine and 34.5 kg of anhydrous hydrofluoric acid were electrolyzed. This cell was designed to be as similar as possible to the laboratory cell. The electrolysis temperature was 0°C, the average current density 0.4 A/dm², and the voltage was from 4.7 to 6.0 volts. In the course of 113 hours, a total of 9.376 kg of amine were converted to yield 10.386 kg of crude product, corresponding to 69.2 percent of the theoretical yield, relative to the reaction equation (cf. Example 3). The qualitative composition was nearly identical to the product of Example 3; the quantitative ratio differed in that the amount of the main component was increased by 11 area percent.

EXAMPLE 7

In analogy to the aforementioned Examples, 557 g of cyclohexyl-bis-(tetrafluoro-ethoxy-isopropyl)-amine were fluorinated in the Simons cell. The process was carried out during 127 hours at an average current density of 0.7 A/dm², a voltage of from 4.2 to 6.7 volts and a constant electrolysis temperature of + 5°C. The starting amine concentration was 7.1 weight %. The electrolysis yielded a total of 306 g of fluorinated crude product, corresponding to 25.4 percent of the theoretical yield, relative to the following reaction equation

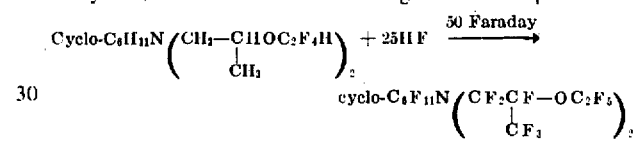

$Cyclo-C_6H_{11}N\left(\begin{array}{c}CH_2-CHOC_2F_4H\\ | \\ CH_3\end{array}\right)_2 + 25HF \xrightarrow{50\ Faraday}$ $cyclo-C_6F_{11}N\left(\begin{array}{c}CF_2CF-OC_2F_5\\ | \\ CF_3\end{array}\right)_2$ The stabilization was carried out in the usual manner by several hours boiling with 20 percent KOH solution; the subsequent steam distillation being replaced by a washing with water. The fractionation resulted in a boiling range of the product of from 175.0° to 218.5°C/760 mm Hg (corrected). Besides various trace components of insignificant concentration, the stabilized product contained the following main components:

1.

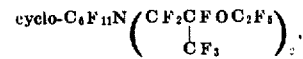

$cyclo-C_6F_{11}N\left(\begin{array}{c}CF_2CFOC_2F_5\\ | \\ CF_3\end{array}\right)_2,$ 20.3 area percent in the gas chromatogram.

The structure is identical to that of the NMR and mass spectra.

Analysis  found: 22.8 % C; 71.1 % F
         calculated: 22.2 % C; 72.6 % F

2. $n-C_6F_{13}N(CF_2CF_2OC_2F_5)_2$; 12.1 area percent.

Analysis  found: 22.2 % C; 70.9 % F
         calculated: 21.9 % C; 72.0 % F

Furthermore, there was identified by mass spectroscopy;

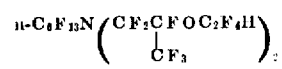

$n-C_6F_{13}N\left(\begin{array}{c}CF_2CFOC_2F_4H\\ | \\ CF_3\end{array}\right)_2$ Heaviest mass observed: $e/m = 867$, corresponding to the peak of the molecule ions. Area percentage in the gas chromatogram: 12.1 percent.

Preparation of formula III products

EXAMPLE 8

A mixture of 2,275 g of dimethyl formamide (DMF), 596 g of tri-ethanolamine and 30.4 g of sodium were heated with agitation and nitrogen flushing, until the sodium was completely dissolved; the temperature rose to 120°C towards the end of the reaction. Tetrafluoro-ethylene was pressed into the solution under a pressure of 2 atm/g in a shaking autoclave. The reaction was carried out without heating; as a result of the slightly exothermic reaction, the temperature rose from 15°C at the start to 40°C. After 2 hours, the reaction was complete, which showed in a drop of the temperature and ceasing of the tetrafluoro-ethylene absorption. The solution obtained had a weight of 3,970 g, corresponding to a $C_2F_4$ absorption of 89.2 percent of the theoretical absorption, relative to the following reaction equation:

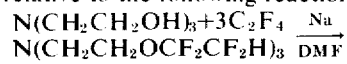

The solution was freed from solvent and catalyst by washing three times with cold water and, after drying with $Na_2SO_4$, directly used for the fluorination, since its thermal instability does not permit a distillation.

The yield of dry crude product was 1,496 g or 83.2 percent of the theoretical yield.

The NMR spectrum showed the expected structure.

According to the IR spectrum, the product contained small amounts of F-olefinic double bonds $CF_2 = CF—$.

| Amine number | found: 22.45; calculated: 22.27; |
| --- | --- |
| Analysis | found: 33.3 % C; 3.9 % H; 47.1 % F calculated: 32.1 % C; 3.3 % H; 50.8 % F |
| $H_2O$ content: | 0.37 %. |

The osmometric molecular weight determination in methanol yielded 417 (theoretical yield: 449). The substance contained no free OH groups.

EXAMPLE 9

According to Example 8, 382 g of tri-iso-propanolamine were dissolved in 383 g of dimethyl formamide and reacted with tetrafluoro-ethylene in the presence of 15.2 g of sodium. After 90 minutes, 560 g of tetrafluoro-ethylene were absorbed, corresponding to 93.3 percent of the theoretical yield, relative to the following reaction equation:

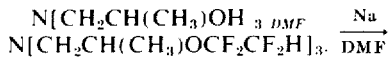

The yield of dry crude product was 790 g or 80.4 percent of the theoretical yield.

The proton resonance spectrum proved the identity with the theoretical structure; also this batch, according to the IR spectrum, contained small amounts of $CF_2 = CF$ groups. Free OH groups were not detected.

| Amine number: | found: 21.5 calculated: 20.7. |
| --- | --- |
| Analysis | found: 36.7 % C; 4.3 % H; 46.4 % F. calculated: 37.6 % C; 4.7 % H; 42.1 % F. |
| $H_2O$ content: | 0.11 % |

The osmometrically determined molecular weight was 480 (methanol); calculated: 491.

What is claimed is

1. A compound of the formula

where $R_{F1}$ and $R_{F2}$ each are linear or branched perfluoro-alkyl radicals having from one to 10 carbon atoms or perfluoro-cyclo-alkyl radicals having from four to 10 carbon atoms $R_3$ is $CF_3$ or F;

$R_4$ is H or F;

$x$, $y$ and $z$ each are integers; $x$ and $y$ being 1, 2 or 3; $z$ being 0, 1 or 2; and $x + y + z$ are 6.

2. A compound as claimed in claim 1, wherein $R_{F1}$ is a perfluoro-cyclohexyl radical.

3. A compound as claimed in claim 1, having the formula

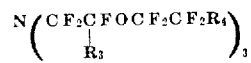

4. A compound as claimed in claim 1, having the formula

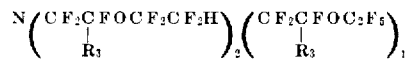

5. A compound as claimed in claim 1 having the formula

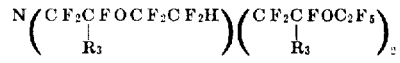

6. A compound as claimed in claim 1, having the formula

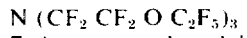

7. A compound as claimed in claim 1, having the formula

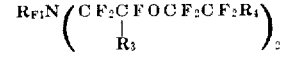

wherein $R_{F1}$ is a perfluoro-alkyl radical having from one to six carbon atoms or a perfluoro-cyclo-alkyl radical having from four to six carbon atoms.

8. A compound as claimed in claim 1, having the formula

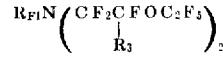

9. A compound as claimed in claim 1, having the formula

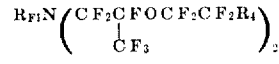

10. A compound as claimed in claim 1, having the formula

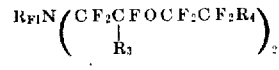

wherein $R_{F1}$ is a perfluoro-alkyl radical having from seven to 10 carbon atoms.

11. A compound as claimed in claim 1, having the formula

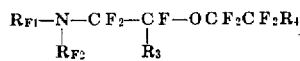

wherein $R_{F1}$ and $R_{F2}$ each are perfluoro-alkyl radicals having from one to six carbon atoms or perfluoro-cyclo-alkyl radicals having from four to six carbon atoms.

12. A compound as claimed in claim 1, having the formula

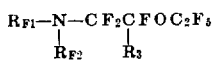

wherein $R_{F1}$ and $R_{F2}$ each are perfluoro-alkyl radicals having from one to six carbon atoms or perfluoro-cyclo-alkyl radicals having from four to six carbon atoms.

13. A compound as claimed in claim 1, having the formula

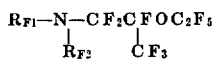

where $R_{F1}$ is a perfluoro-alkyl or perfluoro-cyclo-alkyl radical having from four to six carbon atoms and $R_{F2}$ is a perfluoro-alkyl radical having from one to six carbon atoms.

14. A compound as claimed in claim 1, having the formula

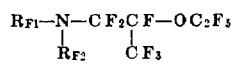

where $R_{F1}$ is a perfluoro-alkyl or perfluoro-cyclo-alkyl radical having from four to six carbon atoms and $R_{F2}$ is a perfluoro-alkyl radical having from one to three carbon atoms.

15. A compound as claimed in claim 1, having the formula

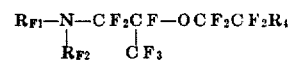

where $R_{F1}$ and $R_{F2}$ each are perfluoro-alkyl radicals having from one to six carbon atoms or perfluoro-cycloalkyl radicals having from four to six carbon atoms.

16. A compound of the formula

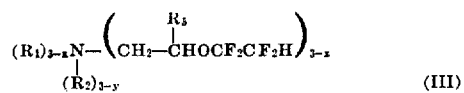

(III)

where
$R_1$ and $R_2$ are alkyl radicals having from one to 10 carbon atoms or cycloalkyl radicals having from four to 10 carbon atoms;
$R_5$ is $CH_3$ or H;
$x$, $y$ and $z$ each are integers; $x$ and $y$ being 1, 2 or 3; $z$ being 0, 1 or 2 and
$x + y + z$ are 6.

* * * * *